(12) United States Patent
Chai et al.

(10) Patent No.: US 11,433,472 B2
(45) Date of Patent: Sep. 6, 2022

(54) COMPUTER CHASSIS WELDING DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Chung Chai, New Taipei (TW); Yu-Ming Xiao, Wuhan (CN); Lin Ding, Wuhan (CN); Zhi-Bing Li, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 675 days.

(21) Appl. No.: 16/504,527

(22) Filed: Jul. 8, 2019

(65) Prior Publication Data

US 2020/0101556 A1 Apr. 2, 2020

(30) Foreign Application Priority Data

Sep. 29, 2018 (CN) .......................... 201811152612.7

(51) Int. Cl.
*B23K 9/00* (2006.01)
*B23K 11/11* (2006.01)
(Continued)

(52) U.S. Cl.
CPC .............. *B23K 11/11* (2013.01); *B23K 9/007* (2013.01); *B23K 37/0211* (2013.01);
(Continued)

(58) Field of Classification Search
CPC . B23K 11/11; B23K 37/0211; B23K 37/0282; B23K 37/04; B23K 3/087;
(Continued)

(56) References Cited

U.S. PATENT DOCUMENTS 4,400,607 A * 8/1983 Wakou ................. B23K 37/047
219/79
4,779,787 A * 10/1988 Naruse ................. B23K 37/047
219/80

(Continued)

FOREIGN PATENT DOCUMENTS

JP           58047578 A  *  3/1983  ............. B23K 11/10
WO     WO-9621611 A1  *  7/1996  ........... B23K 37/047

*Primary Examiner* — Kiley S Stoner
(74) *Attorney, Agent, or Firm* — ScienBiziP, P.C.

(57) ABSTRACT

A chassis welding device for welding brackets as standard members to a body of a chassis includes a frame, a first transferring member, a plurality of loading mechanisms, a plurality of carriers, a conveying member, a shifting member, and a spot welder. The loading mechanism transfers standard members to individual preset positions on the carrier to face the solder joints on the standard members away from the carrier. The first transferring member transports the carrier to the shifting member. The shifting member transfers the carrier from the first transferring member to the spot welder. The conveying member transfers the body into contact with the solder joints. The spot welder applies heat to melt the solder joints to bond the standard members to the body.

20 Claims, 7 Drawing Sheets

(51) Int. Cl.
*B23K 37/04* (2006.01)
*B23K 37/02* (2006.01)
*B23P 19/00* (2006.01)
*B25J 15/06* (2006.01)
*B23K 9/007* (2006.01)

(52) U.S. Cl.
CPC .......... *B23K 37/0282* (2013.01); *B23K 37/04* (2013.01); *B23P 19/007* (2013.01); *B25J 15/06* (2013.01)

(58) Field of Classification Search
CPC .... B23K 37/047; B23K 3/0307; B23K 9/007; B23K 9/32; B23K 3/03–0392; B23K 9/14–147; B23K 10/022; B23K 11/008; B23K 11/10–11; B23K 11/314; B23K 15/008; B23K 20/1265; B23K 26/0617–0619; B23K 26/22; B23P 19/007; B25J 15/06
USPC .................................... 219/80, 86.1–94, 127
See application file for complete search history.

(56) References Cited

U.S. PATENT DOCUMENTS

| | | | | |
|---|---|---|---|---|
| 4,856,698 A | * | 8/1989 | Marianne | B23K 37/047 29/430 |
| 5,111,988 A | * | 5/1992 | Strickland | B23K 37/047 219/161 |
| 6,170,732 B1 | * | 1/2001 | Vogt | B62D 65/00 219/652 |
| 8,201,723 B2 | * | 6/2012 | Kilibarda | B23K 37/047 228/49.1 |
| 9,676,067 B2 | * | 6/2017 | Ryu | B23K 11/315 |
| 2003/0010757 A1 | * | 1/2003 | Yoneya | B23K 11/063 219/83 |
| 2004/0144759 A1 | * | 7/2004 | Cho | B23K 37/0235 219/86.7 |
| 2005/0230374 A1 | * | 10/2005 | Rapp | B23K 37/047 219/158 |
| 2008/0220955 A1 | * | 9/2008 | Hesse | B23P 21/004 29/33 P |
| 2010/0044350 A1 | * | 2/2010 | Heiml | B23P 21/00 228/103 |
| 2012/0055975 A1 | * | 3/2012 | Wei | B23K 37/047 228/6.1 |
| 2015/0034700 A1 | * | 2/2015 | Zhang | B23K 37/04 228/49.5 |
| 2015/0290749 A1 | * | 10/2015 | Katsuyama | B23K 26/08 219/121.67 |
| 2016/0256956 A1 | * | 9/2016 | Nagae | B23K 26/38 |
| 2017/0029052 A1 | * | 2/2017 | Jin | B23K 26/032 |
| 2018/0056364 A1 | * | 3/2018 | Anagnostopoulos | B23K 37/0461 |
| 2018/0194417 A1 | * | 7/2018 | Jakob | B23K 31/02 |
| 2019/0185085 A1 | * | 6/2019 | Toeniskoetter | B23K 37/047 |
| 2020/0052451 A1 | * | 2/2020 | Wang | B23K 37/0235 |
| 2020/0233395 A1 | * | 7/2020 | Matsumoto | H05K 13/0812 |
| 2021/0071829 A1 | * | 3/2021 | Shan | F21S 4/10 |
| 2021/0094637 A1 | * | 4/2021 | Kang | B23K 37/047 |

* cited by examiner

COMPUTER CHASSIS WELDING DEVICE

FIELD

The subject matter herein generally relates to electronic device housings.

BACKGROUND

Computer chassis include a plurality of brackets to fix components. The bracket is generally welded or screwed to a shell of the computer chassis. Due to the material of the bracket and the position of the bracket being different, an installation process of the bracket has many steps.

Therefore, there is room for improvement within the art.

BRIEF DESCRIPTION OF THE DRAWINGS

Implementations of the present technology will now be described, by way of embodiments with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to show details and features of the present disclosure better. The disclosure is by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1 to FIG. 5 illustrate a chassis welding device 100. The chassis 200 includes a body 201 and a plurality of welding standard members 202, 203, 204. Each of the welding standard members 202, 203, 204 has a plurality of solder joints 207 and defines two positioning holes 208. The chassis welding device 100 is configured to weld the plurality of welding standard members 202, 203, 204 to the body 201. In the embodiment, the plurality of welding standard members 202, 203, 204 have different structures, and the chassis 200 includes five first welding standard members 202, three second welding standard members 203 and one third welding standard member 204.

Figure 1:
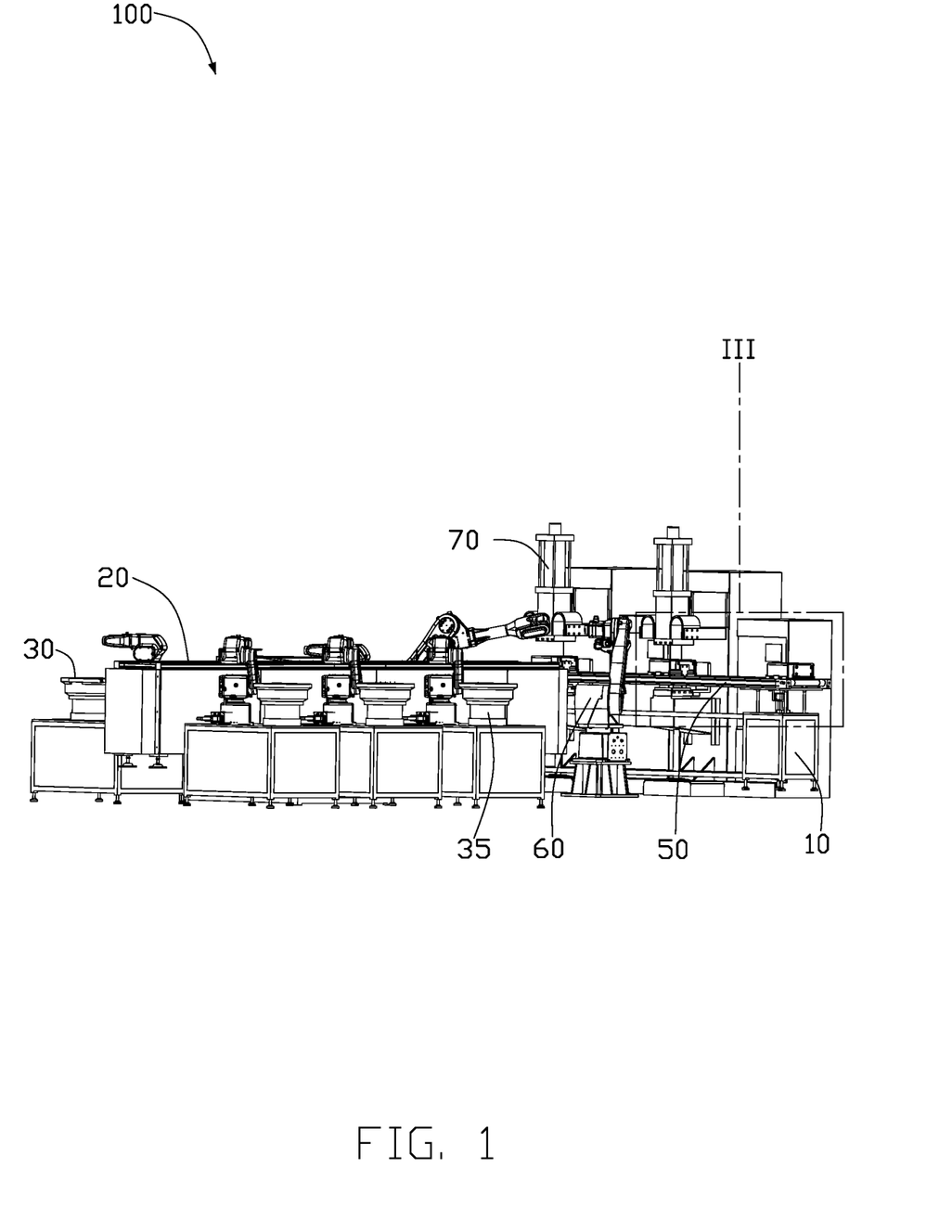
FIG. 1 is an isometric view of a chassis welding device according to an embodiment.
Figure 2:
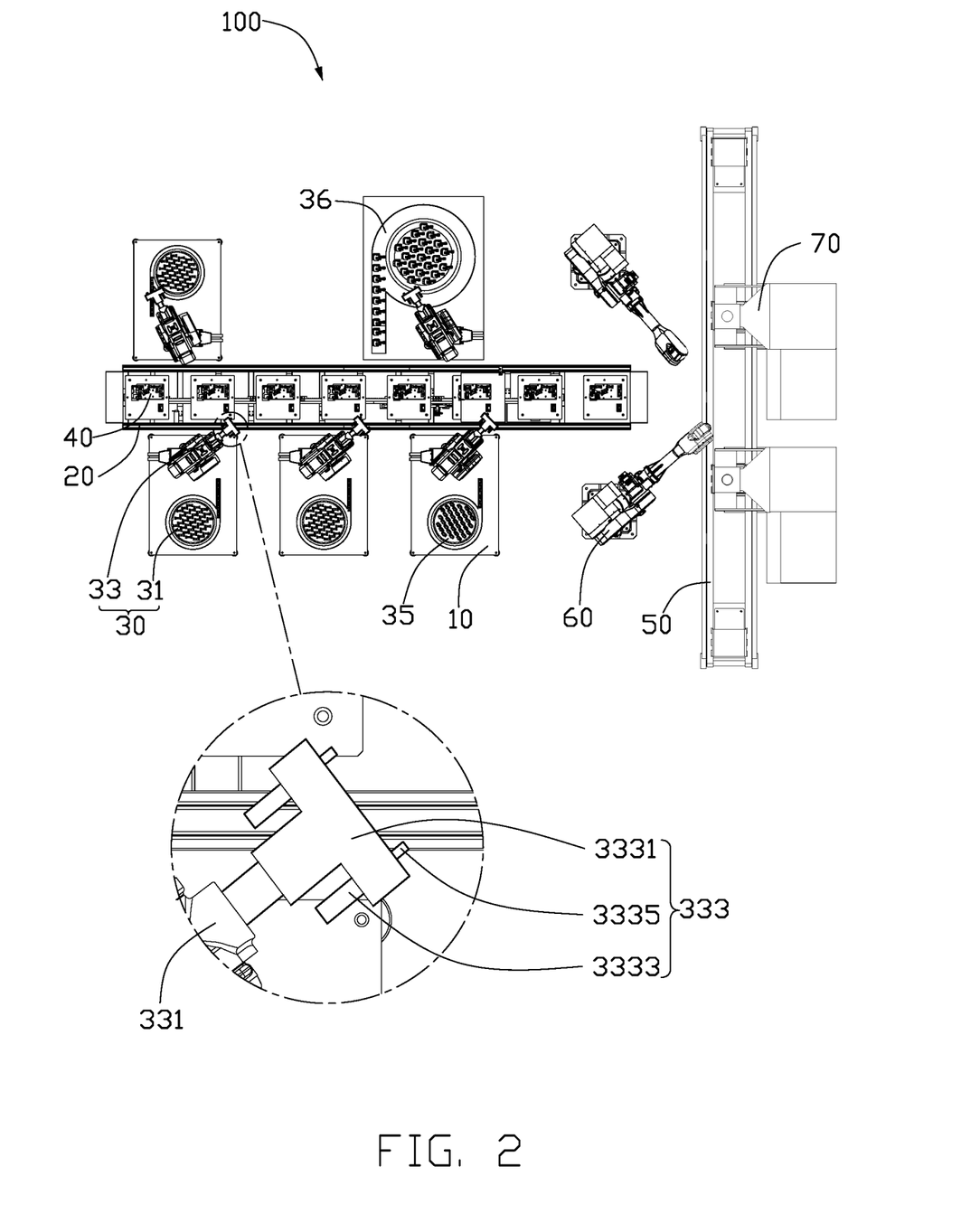
FIG. 2 is a top view of the chassis welding device of FIG. 1.

The chassis welding device 100 includes a frame 10, a first transferring member 20, a plurality of carriers 40, a plurality of loading mechanisms 30, 35, 36, a conveying member 50, and at least one shifting member 60 and at least one spot welder 70. The first transferring member 20, the plurality of loading mechanisms 30, 35, 36, and the conveying member 50 are positioned on the frame 10. The loading mechanisms 30, 35, 36 are located two sides of the transferring member 20. The loading mechanisms 30, 35, 36 load the welding standard members 202, 203, 204 and transfer the welding standard members 202, 203, 204 to preset position on the carrier 40, and make the plurality of solder joints 207 face away from the carrier 40. The carriers 40 are sequentially placed on the first transferring member 20. The first transferring member 20 transports the carriers 40 toward the conveying member 50. The shifting member 60 is located adjacent to an intersection of the first transferring member 20 and the conveying member 50. The spot welder 70 is located on a side of the conveying member 50. The shifting member 60 transfers the carrier 40 from the first transferring member 20 to the spot welder 70. The conveying member 50 transfers the body 201 into contact with the solder joints 207. The spot welder 70 melts the plurality of solder joints 207 to bond the first welding standard member 202, the second welding standard member 203, and the third welding standard member 204 to the body 201.

In the embodiment, the chassis welding device 100 includes two first loading mechanisms 30, two second loading mechanisms 35, and one third loading mechanism 36. The two first loading mechanisms 30 load a plurality of first welding standard members 202 and transfer the first welding standard members 202 to first preset positions on the carrier 40. The two second loading mechanisms 35 load a plurality of second welding standard members 203 and transfer the second welding standard members 203 to second preset positions on the carrier 40. The third loading mechanism 36 loads a plurality of third welding standard members 204 and transfers the third welding standard members 204 to third preset positions on the carrier 40.

In the embodiment, since five first welding standard members 202 are to be welded on the body 201, the two first loading mechanisms 30 simultaneously perform the loading operation of the first welding standard member 202 to improve work efficiency. It can be understood that, in other embodiments, the number of first loading mechanisms 30, second loading mechanisms 35, and third loading mechanisms 36 may be one or more than one. It can be understood that the corresponding loading mechanism can be increased to increase the versatility of the chassis welding device 100 according to the structural types of the welding standard members 202, 203, and 204.

Referring to FIG. 2, the first loading mechanism 30 includes a vibrating filter 31 and a material moving member 33. The vibrating filter 31 and the material moving member 33 are positioned on the frame 10 and located at a side of the first transferring member 20. The vibrating filter 31 loads and outputs the plurality of first welding standard members 202 with the solder joints 207 facing upward. The material moving member 33 grasps the first welding standard member 202 and transfers the first welding standard member 202 to the first preset positions on the carrier 40.

The material moving member 33 includes a robot 331 and a gripper 333 fixed at an end of the robot 331. The robot 331 is positioned on the frame 10. The gripper 333 grasps and releases the first welding standard member 202. The robot 331 drives the gripper 333 to transfer the first welding standard member 202 from an output end of the vibrating screen 31 to the first preset position on the carrier 40.

In the embodiment, the gripper 333 includes a stripping cylinder 3331 and two magnets 3333. The stripping cylinder 3331 is positioned at the end of the robot 331. Two magnets 3333 are positioned on sides of the stripping cylinder 3331. The magnet 3333 attracts the first welding standard member 202. A positioning pin 3335 is fixed at one end of each magnet 3333. The positioning pin 3335 is inserted into the positioning hole 208 to allow the magnet 3333 to accurately attract and hold the first welding standard member 202. The stripping cylinder 3331 drives the first welding standard member 202 to disengage from the two magnets 3333 to position the first welding standard member 202 onto the carrier 40. It can be understood that, in other embodiments, the gripper 333 can be cylindrical jaws or a suction cup.

In the embodiment, the robot 331 and the shifting member 60 are six-axis robots, but are not limited thereto. In other embodiments, the robot 331 and the shifting member 60 may be four-axis robots.

It can be understood that in other embodiments, the material moving member 33 or the shifting member 60 can be a combination of a three-coordinate moving module, a rotating cylinder, and cylindrical jaw. The three-coordinate moving module drives the first welding standard member 202 to move, and the rotating cylinder drives the first welding standard member 202 to rotate, and the cylindrical jaw grasps and releases the first welding standard member 202.

Figure 4:
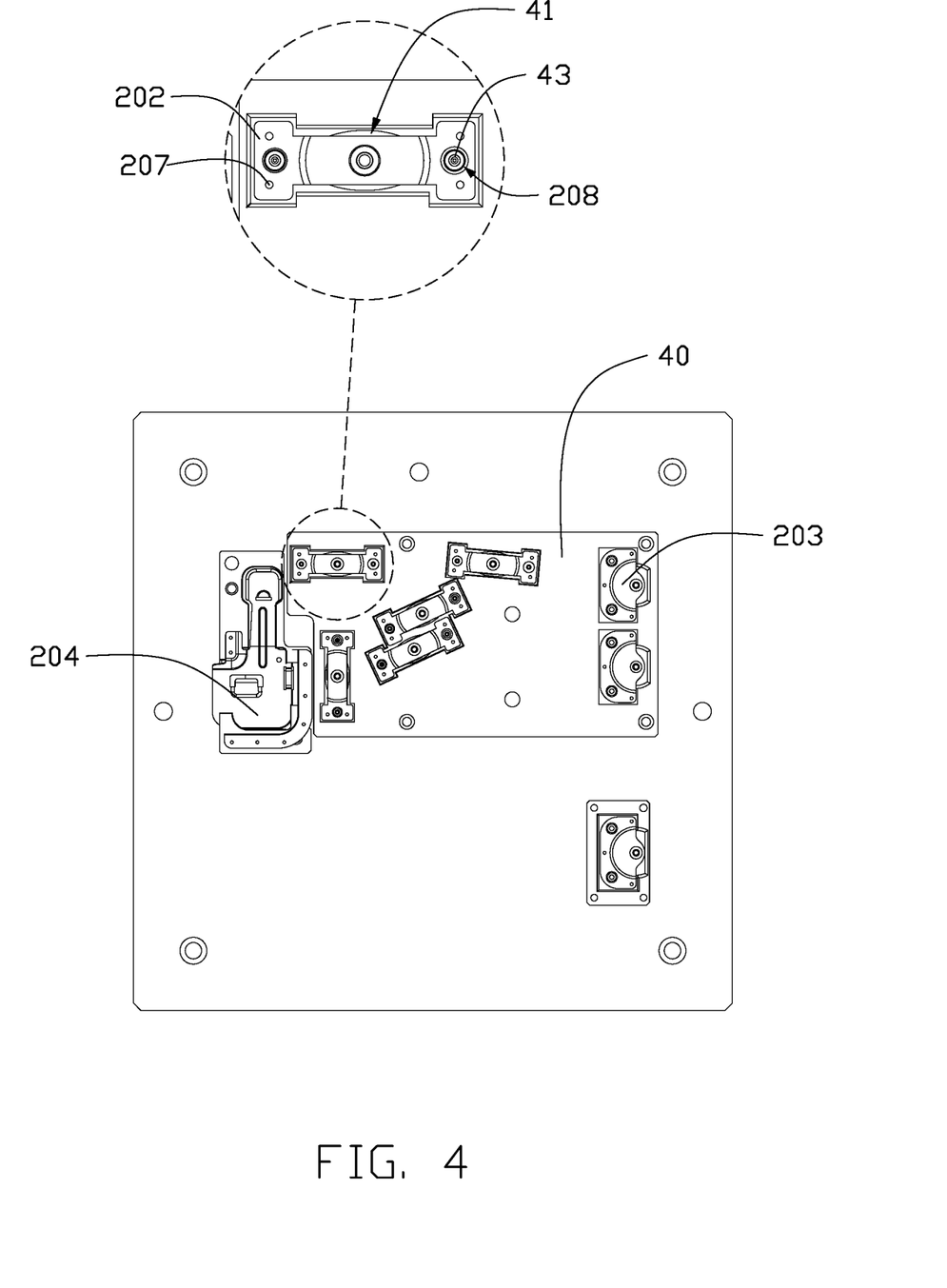
FIG. 4 is a top view of a carrier and a plurality of welding standard parts of the device shown in FIG. 1.

Referring to FIG. 4, the carrier 40 defines a plurality of receiving slots 41. The receiving slots 41 are arranged at positions where the first welding standard member 202, the second welding standard member 203, and the third welding standard member 204 are welded to the body 201. In the embodiment, the number of receiving slots 41 is nine, which is same number as the welding standard members 202, 203, and 204. The receiving slots 41 are configured to receive the first welding standard member 202, the second welding standard member 203, and the third welding standard 204. The solder joints 207 are in the same plane and protrude out of the carrier 40. A plurality of positioning rods 43 are positioned on the carrier 40. Two first positioning rods 43 are located in one receiving slot 41. Each first positioning rod 43 is inserted into the positioning hole 208 to position the welding standard members 202, 203, 204 on the carrier 40. The carrier 40 is made of a conductive material.

Figure 3:
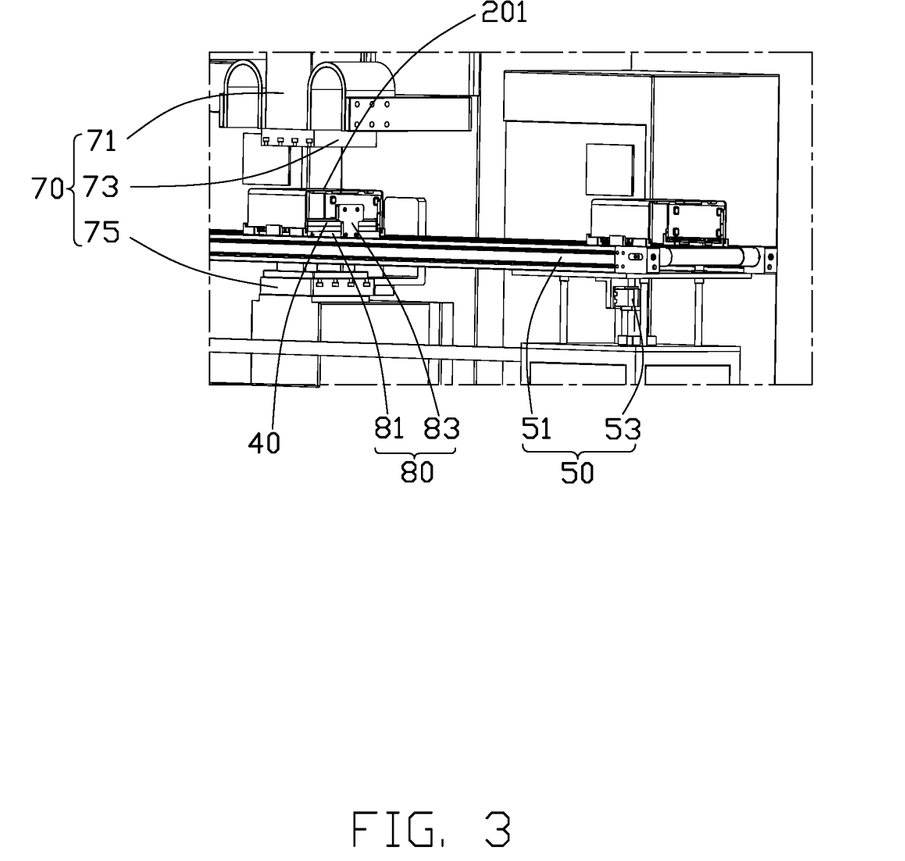
FIG. 3 is a view of the circled portion III of FIG. 1.

Referring to FIG. 3, the conveying member 50 includes a second transferring member 51 and at least one lifting member 53. In the embodiment, the number of lifting members 53 is two. Two lifting members 53 are positioned on the frame 10. The second transferring member 51 is positioned on the lifting member 53. The two lifting members 53 are located at both ends of the second transferring member 51. The second transferring member 51 transfers the body 201 to pass through the spot welder 70. The lifting member 53 drives the second transferring member 51 to move up and down. In other embodiments, there may be only one lifting member 53, located near the spot welder 70.

The spot welder 70 includes a horn 71, a first electrode 73, and a second electrode 75. The second electrode 75 is positioned at an end of the horn 71 and is located above the conveying member 50. The first electrode 73 is located below the conveying member 50. The first electrode 73 and the second electrode 75 face each other. The horn 71 drives the second electrode 75 to move toward the first electrode 73.

The chassis welding device 100 further includes a blocking mechanism 80. The blocking mechanism 80 includes a positioning member 81 and two baffles 83. The positioning member 81 is positioned on the first electrode 73, and the positioning member 81 is electrically connected to the first electrode 73. The positioning member 81 carries and positions the carrier 40. Two baffles 83 are positioned on opposite sides of the positioning member 81.

When the second transferring member 51 transports the body 201 between the second electrode 75 and the first electrode 73, the lifting member 53 drives the second transferring member 51 down. The body 201 is moved down between the two baffles 83 and is in contact with the solder joints 207 of the plurality of soldering standard members 202, 203, 204. The horn 71 drives the second electrode 75 down until it is pressed against the body 201. At this time, the second electrode 75 and the first electrode 73 are turned on, and the high temperature generated by the spot welder 70 during the instantaneous short circuit can melt the solder joint 207 to bond the soldering standard members 202, 203, 204 to the body 201.

In the embodiment, the number of spot welders 70 is two. Two spot welders 70 are located on the side of the conveying member 50 that faces away from the first transferring member 20. The number of shifting members 60 is also two. Two shifting members 60 are located on two sides of the first transferring member 20. Each transfer member 60 transfers the carrier 40 to the first electrode 73 of one of the spot welders 70. In the embodiment, the two spot welders 70 weld simultaneously. In other embodiments, the number of spot welders 70 and transfer members 60 may be one of each or more than two of each.

In operation, the carriers 40 are sequentially placed on the first transferring member 20. The first transferring member 20 transports the carriers 40 toward the second transferring member 51. The first loading mechanism 30 feeds the first welding standard member 202 to the first preset position on the carrier 40. The second loading mechanism 35 feeds the second welding standards 203 to the second preset position on the carrier 40. The third loading mechanism 36 feeds the third welding standard 204 to the third preset position on the carrier 40. The shifting member 60 grips and transfers the carrier 40 carrying the first welding standard member 202, the second welding standard member 203, and the third welding standard member 204 to the positioning member 81. The bodies 201 are spaced apart from each other on the second transferring member 51. When the second transferring member 51 transports the body 201 to move between the second electrode 75 and the first electrode 73, the lifting member 53 drives the second transferring member 51 to descend. The body 201 is moved down to contact each of the solder joints 207. The horn 71 drives the second electrode 75 down until it is pressed against the body 201. At this time, the second electrode 75, the body 201, the welding standard members 202, 203, 204, the carrier 40, the positioning member 81, and the first electrode 73 are sequentially turned on. The high temperature are generated by the spot welder 70 during the instantaneous short circuit melts the solder joints 207 to bond the soldering standard members 202, 203, 204 to the body 201. Thus the chassis soldering device 100 completes the soldering operation of one chassis 200.

Figure 7:
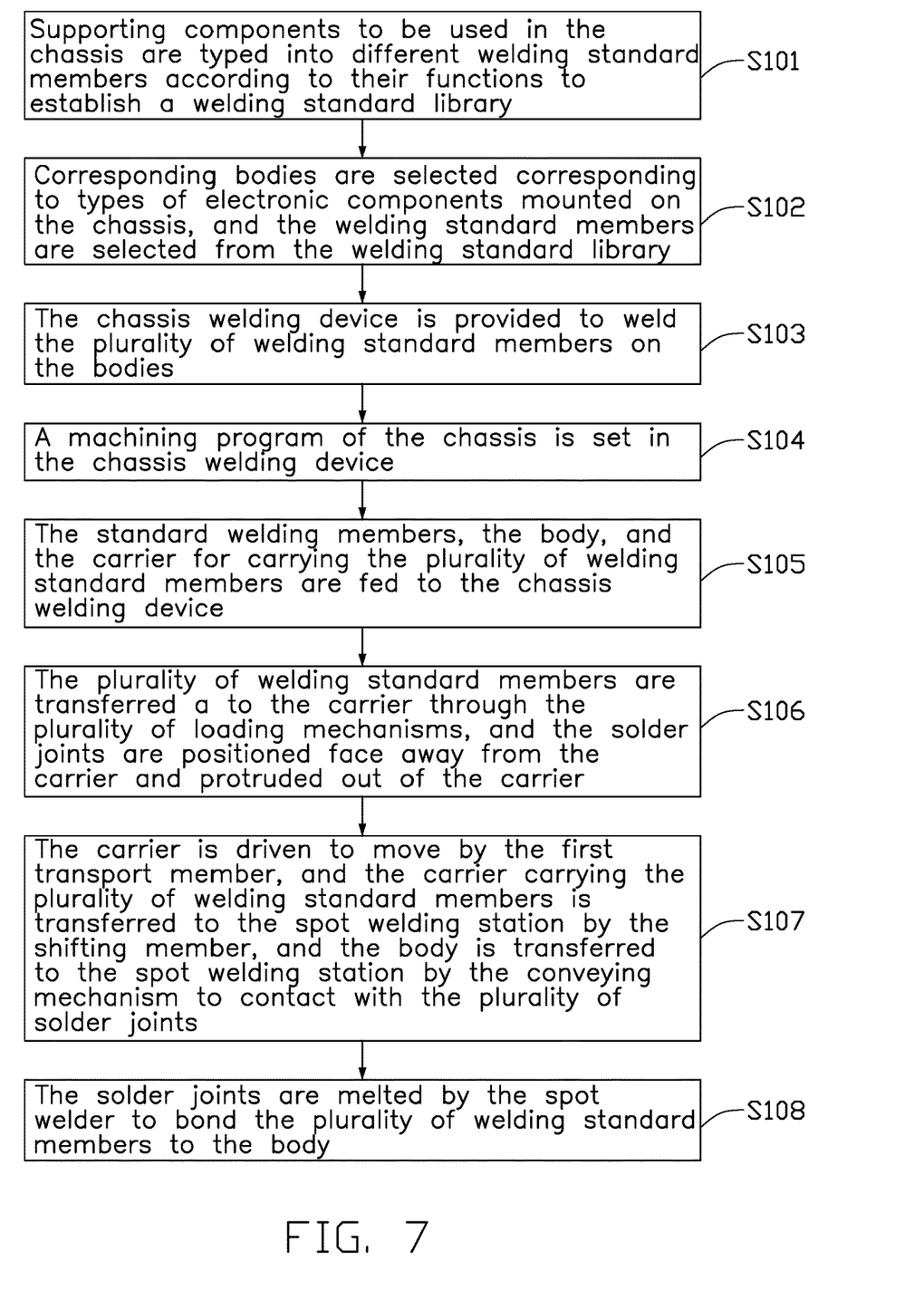
FIG. 7 is a flowchart of a method for welding chassis.

FIG. 7 illustrates a flowchart of a method for welding chassis. The method is provided by way of example, as there are a variety of ways to carry out the method. Each block shown in FIG. 7 represents one or more processes, methods, or subroutines, carried out in the exemplary method. Additionally, the illustrated order of blocks is by example only and the order of the blocks can be changed according to the present disclosure. The method can begin at block 101. Depending on the embodiment, additional steps can be added, others removed, and the ordering of the steps can be changed.

At block 101, supporting components (such as brackets) to be used in the chassis are typed into different welding standard members 202, 203, 204, 205, 303, 304 according to their functions to establish a welding standard library. Different welding standard members have different structural dimensions.

Each welding standard member alone or in combination with two or more welding standard members performs a function. For example, the welding standard members 203, 204 are used to support and fix a main board of the chassis 200. The welding standard member 202 is used to support a power of the chassis 200.

Different chassis can be corresponding to different welding standard libraries are available when the For example, large chassis, medium chassis, and small chassis can have different welding standard libraries.

At 102: Corresponding bodies 201 and 301 are selected corresponding to types of electronic components mounted on the chassis 200 and 300, and the welding standard members 202, 203, 204, 205, 303, 304 are selected from the welding standard library.

Figure 5:
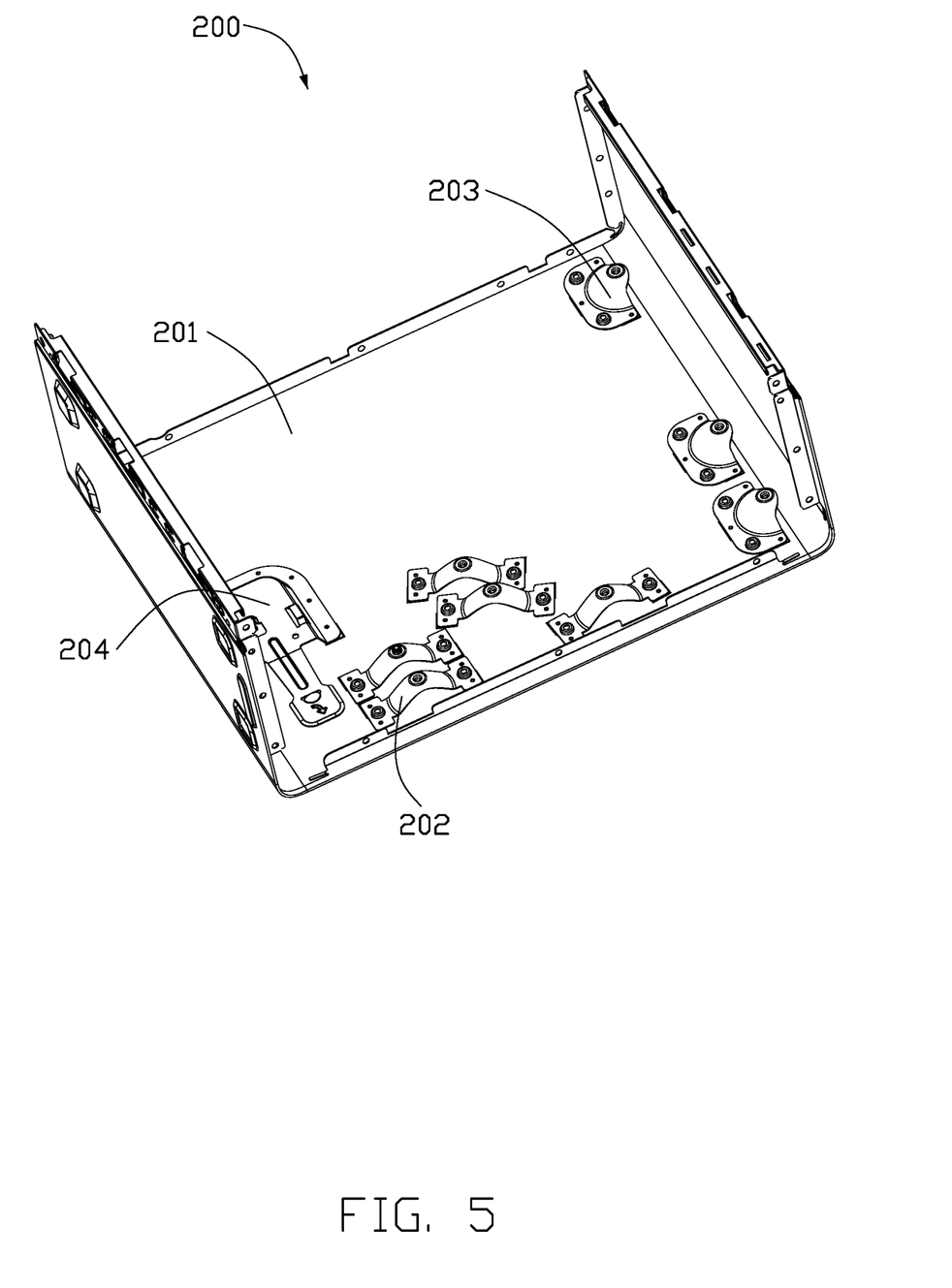
FIG. 5 is an isometric view of a chassis welded by the chassis welding device of FIG. 1 according to an embodiment.
Figure 6:
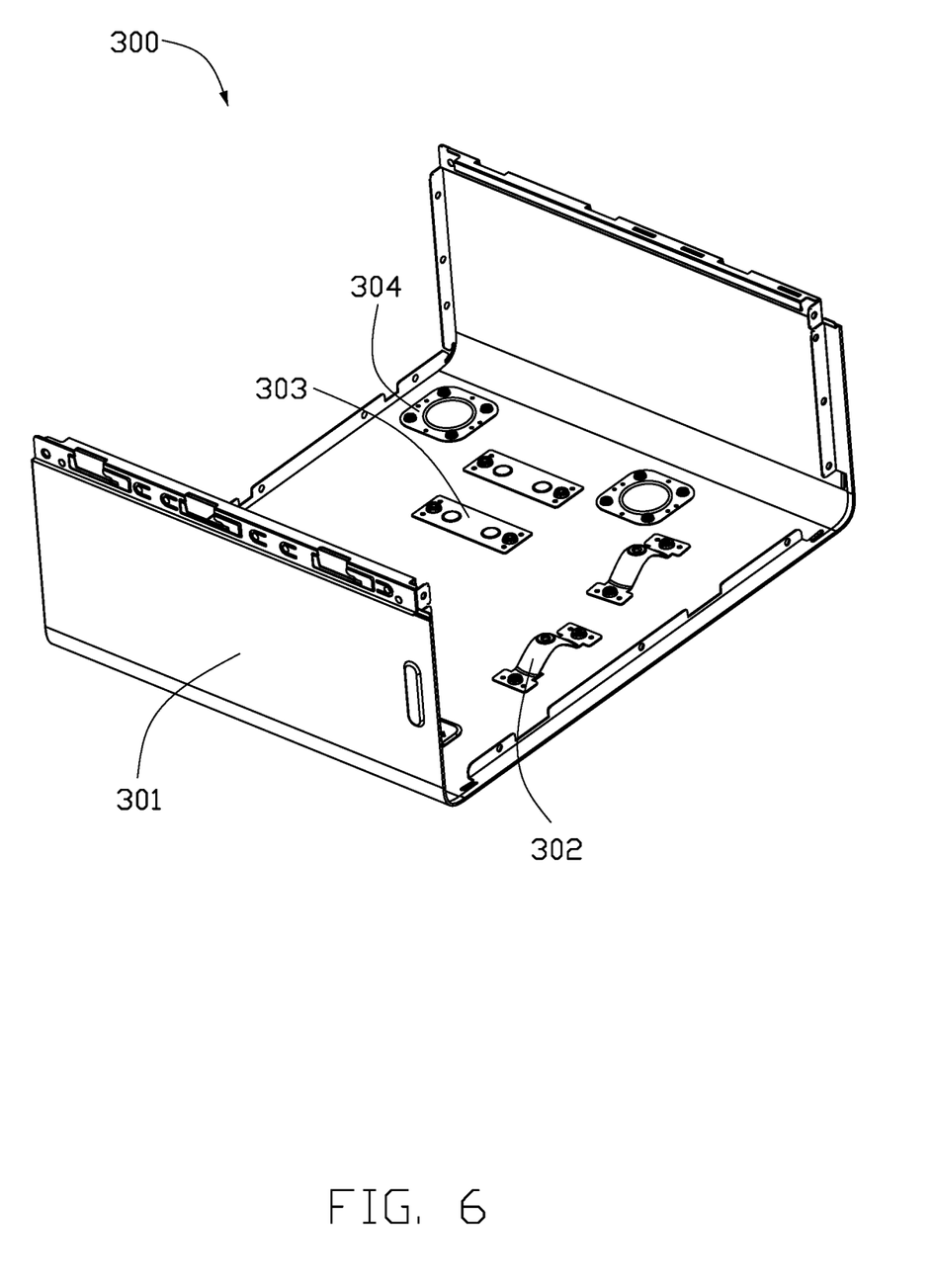
FIG. 6 is an isometric view of a chassis welded by the chassis welding device of FIG. 1 according to another embodiment.

As shown in FIG. 5, in the embodiment, the chassis 200 includes the body 201, the first welding standard member 202, the second welding standard member 203, and the third welding standard member 204. As shown in FIG. 6, in another embodiment, the chassis 300 includes the body 301, the first welding standard member 202, a fourth welding standard member 303, and a fifth welding standard member 304.

Different chassis 200 and 300 belong to the same type. For example, the chassis 200 and 300 are small chassis, but the electronic components are different. Different chassis can belong to different types.

S103: The chassis welding device 100 is provided to weld the plurality of welding standard members 202, 203, 204, 205, 303, 304 on the bodies 201, 301.

S104: A machining program of the chassis 200, 300 is set in the chassis welding device 100.

The machining program includes an operating time node and an operating path of the chassis welding device 100 which are predetermined according to model parameters of the bodies 201, 202 and the plurality of welding standard members 202, 203, 204, 303, 304, and position parameters of the welding standard members 202, 203, 204, 303, 304 welded to the body 201, 301.

In the embodiment, the machining program includes the operating time node and the operating path of the chassis welding device 100 which are predetermined according to model parameters of the body 201, the first welding standard member 202, the second welding standard member 203 and the third welding standard member 204, and position parameters of the first welding standard member 202, the second welding standard member 203 and the third welding standard member 204. The machining program includes transferring paths and action time nodes of the first feeding mechanism 30, the second loading mechanism 35, the third loading mechanism 36 and the shifting member 60, speeds of the first transferring member 20 and the second t transferring member 51, an operating time node of the lifting member 53 and an operating time node of the spot welder 70.

S105: The standard welding members 202, 203, 204, the body 201, and the carrier 40 for carrying the plurality of welding standard members 202, 203, 204 are fed to the chassis welding device 100.

In the embodiment, the chassis welding device 100 welds the processing chassis 200. The plurality of first welding standard members 202 are placed on the first loading mechanism 30. The plurality of second welding standard members 203 are placed in the second loading mechanism 35. The plurality of third welding standard members 204 are placed in the third loading mechanism 36. The plurality of carriers 40 are positioned on the first transferring member 20. The plurality of bodies 201 are positioned on the second transferring member 51.

It can be understood that, in other embodiments, when the chassis welding device 100 is soldering a chassis 300, a plurality of first welding standard members 202 are positioned on the first loading mechanism 30, a plurality of fourth welding standard members 303 are positioned in the second loading mechanism 35, a plurality of fifth welding standard members 304 are positioned in the third loading mechanism 36. At the same time, a plurality of other carriers (not shown) for carrying the first welding standard members 202, the fourth welding standard members 303 and the fifth welding standard members 304 are positioned on the first transferring member 20. A plurality of bodies 301 are positioned on the second transferring member 51.

S106: The plurality of welding standard members 202, 203, 204 are transferred a to the carrier 40 through the plurality of loading mechanisms 30, 35, 36, and the solder joints 207 are positioned face away from the carrier 40 and protruded out of the carrier 40.

In this embodiment, the first loading mechanism 30 transfers the first welding standard member 202 to the first preset position on the carrier 40; the second loading mechanism 35 transfers the second welding standard member 203 to the second preset position on the carrier 40. The third loading mechanism 36 transfers the third welding standard member 204 to the third preset position on the carrier 40.

S107: The carrier 40 is driven to move by the first transport member 20, and the carrier 40 carrying the plurality of welding standard members 202, 203, 204 is transferred to the spot welding station by the shifting member 60, and the body 201 is transferred to the spot welding station by the conveying mechanism 50 to contact with the plurality of solder joints 207.

The shifting member 60 transfers the carrier 40 to the first electrode 73 of the spot welder 70. When the second transferring member 51 transfers the body 201 above the carrier 40, the lifting member 53 drives the second transferring member 51 upward to make the body 201 disengage from the second transferring member 51 and contact with solder joints 207 of the first welding standard members 202, the second welding standard members 203 and the third welding standard members 204.

S108: The solder joints 207 are melted by the spot welder 70 to bond the plurality of welding standard members 202, 203, 204 to the body 201.

The horn 71 drives the second electrode 75 to move until it abuts against the body 201. At this time, the second electrode 75 and the first electrode 73 are turned on, and the high temperature are generated by the spot welder 70 during the instantaneous short circuit can melt the plurality of solder joints 207 to bond the first welding standard member 202, the second welding standard member 203, and the third welding standard member 204 to the body 201.

The chassis welding device 100 of the present invention simultaneously transfers the first welding standard member 202, the second welding standard member 203 and the third welding standard member 204 to the carrier 40 by the loading mechanism 30, 35, 36, and simultaneously transports the carrier 40 and the body 201 to the spot welder 70 by the first transferring member 20, the shifting member 60 and the conveying member 50. The spot welder 70 melts the plurality of welding standard members 202, 203, 204 on the body 201 at one time. When welding different chassis 300, it is only necessary to feed another body 301 and corresponding welding standard members 202, 303, 304 to the chassis welding device 100. Thus, the chassis welding device 100 has high welding efficiency and good versatility.

The method for welding chassis firstly types the fixed type supporting components used in the chassis into different welding standard member according to different functions, and different chassis 200 and 300 can adopt the same welding standard part 202, thereby improving versatility of the welding standard member. Because the machining program of the chassis 200, 300 is set in the chassis welding device 100, when welding different chassis 300, only the machining program of the chassis welding device 100 needs to be replaced and other carriers corresponding to the body 301, the welding standard members 202, 303, and 304 are fed. The plurality of welding standard members 202, 203, 204 are simultaneously transferred a to the carrier 40 by the loading mechanisms 30, 35, 36. The spot welder 70 welds the plurality of welding standard members 202, 203, 204 to the body 201 at one time, the efficiency of the welding chassis is further improved, and the automation and standardization of welding chassis are realized.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A chassis welding device configured to weld welding standard members to a body of a chassis, the chassis welding device comprising:
   a frame;
   a first transferring member;
   at least two loading mechanisms;
   a plurality of carriers;
   a conveying member;
   at least one shifting member; and
   at least one spot welder;
   wherein the first transferring member, the at least two loading mechanisms and the conveying member are positioned on the frame, the at least two loading mechanisms are located at two sides of the transferring member respectively, the loading mechanisms load the welding standard members and transfer the welding standard members to a preset position on the carrier to make a plurality of solder joints on the welding standard members face away from the carrier, the plurality of carriers are sequentially placed on the first transferring member, the first transferring member transports the plurality of carriers toward the conveying member, the shifting member is located adjacent to an intersection of the first transferring member and the conveying member, the at least one spot welder is located on a side of the conveying member, the shifting member transfers the carrier from the first transferring member to the spot welder, the conveying member transfers the body to contact with the plurality of solder joints, the spot welder melts the plurality of solder joints to bond the welding standard members to the body.

2. The chassis welding device of claim 1, wherein each of the loading mechanisms comprises a vibrating filter and a material moving member, the vibrating filter and the material moving member are positioned on the frame and located at a side of the first transferring member, the vibrating filter loads and outputs the welding standard members, the material moving member grasps the welding standard members and transfers the welding standard member to the first preset position.

3. The chassis welding device of claim 2, wherein the material moving member comprises a robot and a gripper fixed at an end of the robot, the robot is positioned on the frame, the gripper grasps and releases the welding standard member, the robot drives the gripper to transfer the first welding standard from an output end of the vibrating screen to the preset position.

4. The chassis welding device of claim 3, wherein the gripper comprises a stripping cylinder and two magnets, the stripping cylinder is positioned at the end of the robot, two magnets are positioned on two sides of the stripping cylinder respectively, the magnet attracts the welding standard members, the stripping cylinder drives the welding standard members to disengage from the two magnets to position the welding standard member onto the carrier.

5. The chassis welding device of claim 1, wherein the conveying member comprises a second transferring member and a lifting member, the lifting member is positioned on the frame, the second transferring member is positioned on the lifting member, the second transferring member transfers the body to pass through the spot welder, the lifting member drives the second transferring member to move down to disengage from the body and contact with the older joints.

6. The chassis welding device of claim 5, wherein the spot welder comprises a horn, a first electrode and a second electrode, the second electrode is positioned at an end of the horn and is located above the conveying member, the first electrode is located below the conveying member, the horn drives the second electrode to move toward the first electrode.

7. The chassis welding device of claim 6, wherein the chassis welding device further comprises a blocking mechanism, the blocking mechanism comprises a positioning member and two baffles, the positioning member is positioned on the first electrode, and the positioning member is electrically connected to the first electrode, the positioning member carries and positions the carrier, two baffles are positioned on two opposite sides of the positioning member, the two baffles block the body to make the body stationary relative to the positioning member.

8. The chassis welding device of claim 1, wherein the carrier defines a plurality of receiving slots, the receiving slots are arranged at positions where the welding standard members are welded to the body, the receiving slots receives the welding standard members, the solder joints protrudes out of the carrier.

9. The chassis welding device of claim 8, wherein each of the welding standard members defines two positioning holes, a plurality of positioning rods are positioned on the carrier, each of the two first positioning rods is located in one of the receiving slots, each of the first positioning rods is inserted into a corresponding one of the positioning holes to position the welding standard members on the carrier.

10. The chassis welding device of claim 1, wherein the carrier is made of a conductive material.

11. A chassis welding device configured to weld welding standard members to a body of a chassis, the chassis welding device comprising:
- a frame;
- a first transferring member;
- at least two loading mechanisms;
- a plurality of carriers;
- a conveying member;
- at least one shifting member; and
- at least one spot welder;
- wherein the first transferring member, the at least two loading mechanisms and the conveying member are fixed to the frame, the at least two loading mechanisms are fixed at least one side of the transferring member, the loading mechanisms load the welding standard members and transfer the welding standard members to a preset position on the carrier to make a plurality of solder joints on the welding standard members face away from the carrier, the plurality of carriers are arranged on the first transferring member, the first transferring member transports the plurality of carriers toward the conveying member, the shifting member is located at an intersection of the first transferring member and the conveying member, the shifting member transfers the carrier from the first transferring member to the spot welder, the conveying member transfers the body to contact with the plurality of solder joints, the spot welder melts the plurality of solder joints to bond the welding standard members to the body.

12. The chassis welding device of claim 11, wherein each of the loading mechanisms comprises a vibrating filter and a material moving member, the vibrating filter and the material moving member are positioned on the frame and located at a side of the first transferring member, the vibrating filter loads and outputs the welding standard members, the material moving member grasps the welding standard members and transfers the welding standard member to the first preset position.

13. The chassis welding device of claim 12, wherein the material moving member comprises a robot and a gripper fixed at an end of the robot, the robot is positioned on the frame, the gripper grasps and releases the welding standard member, the robot drives the gripper to transfer the first welding standard from an output end of the vibrating screen to the preset position.

14. The chassis welding device of claim 13, wherein the gripper comprises a stripping cylinder and two magnets, the stripping cylinder is positioned at the end of the robot, two magnets are positioned on two sides of the stripping cylinder respectively, the magnet attracts the welding standard members, the stripping cylinder drives the welding standard members to disengage from the two magnets to position the welding standard member onto the carrier.

15. The chassis welding device of claim 11, wherein the conveying member comprises a second transferring member and a lifting member, the lifting member is positioned on the frame, the second transferring member is positioned on the lifting member, the second transferring member transfers the body to pass through the spot welder, the lifting member drives the second transferring member to move downwards to disengage from the body and contact with the solder joints.

16. The chassis welding device of claim 15, wherein the spot welder comprises a horn, a first electrode and a second electrode, the second electrode is positioned at an end of the horn and is located above the conveying member, the first electrode is located below the conveying member, the horn drives the second electrode to move toward the first electrode.

17. The chassis welding device of claim 16, wherein the chassis welding device further comprises a blocking mechanism, the blocking mechanism comprises a positioning member and two baffles, the positioning member is positioned on the first electrode, and the positioning member is electrically connected to the first electrode, the positioning member carries and positions the carrier, two baffles are positioned on two opposite sides of the positioning member, the two baffles block the body to make the body stationary relative to the positioning member.

18. The chassis welding device of claim 11, wherein the carrier defines a plurality of receiving slots, the receiving slots are arranged at positions where the welding standard members are welded to the body, the receiving slots receives the welding standard members, the solder joints protrudes out of the carrier.

19. The chassis welding device of claim 18, wherein each of the welding standard members defines two positioning holes, a plurality of positioning rods are positioned on the carrier, each of the two first positioning rods are located in one of the receiving slots, each of the first positioning rods is inserted into a corresponding one of the positioning holes to position the welding standard members on the carrier.

20. The chassis welding device of claim 11, wherein the carrier is made of a conductive material.

* * * * *